United States Patent
Lu et al.

(10) Patent No.: US 12,282,521 B2
(45) Date of Patent: *Apr. 22, 2025

(54) CONTENT PRESENTATION

(71) Applicant: Pinterest, Inc., San Francisco, CA (US)

(72) Inventors: Wendy Lu, San Francisco, CA (US);
Justin Velo, San Francisco, CA (US);
Kelvin Tow, San Francisco, CA (US);
Mengya You, San Francisco, CA (US);
Nicole Crawford, San Francisco, CA (US); Harrison He, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/467,129

(22) Filed: Sep. 14, 2023

(65) Prior Publication Data
US 2024/0004946 A1   Jan. 4, 2024

Related U.S. Application Data

(63) Continuation of application No. 17/876,827, filed on Jul. 29, 2022, now Pat. No. 11,790,024, which is a continuation of application No. 17/208,737, filed on Mar. 22, 2021, now Pat. No. 11,403,360, which is a continuation of application No. 15/926,955, filed on Mar. 20, 2018, now Pat. No. 10,956,529.

(51) Int. Cl.
| | | |
|---|---|---|
| G06F 17/00 | (2019.01) | |
| G06F 3/04845 | (2022.01) | |
| G06F 3/0485 | (2022.01) | |
| G06F 16/54 | (2019.01) | |
| G06F 16/954 | (2019.01) | |
| G06F 16/957 | (2019.01) | |

(52) U.S. Cl.
CPC ........ *G06F 16/954* (2019.01); *G06F 3/04845* (2013.01); *G06F 3/0485* (2013.01); *G06F 16/54* (2019.01); *G06F 16/957* (2019.01)

(58) Field of Classification Search
CPC .. G06F 16/954; G06F 3/04845; G06F 3/0485; G06F 16/54; G06F 16/957; G06F 16/532; G06F 16/58; G06F 16/9577
See application file for complete search history.

(56) References Cited

U.S. PATENT DOCUMENTS

| | | |
|---|---|---|
| 7,006,091 B2 | 2/2006 | Masera et al. |
| 8,042,063 B1 | 10/2011 | Lin-Hendel |
| 8,621,343 B2 | 12/2013 | Steelberg et al. |
| 8,914,900 B2 | 12/2014 | Smith et al. |
| 9,256,891 B2 * | 2/2016 | Reis .................. G06Q 30/0241 |

(Continued)

*Primary Examiner* — Laurie A Ries
(74) *Attorney, Agent, or Firm* — Athorus, PLLC

(57) ABSTRACT

Methods, systems, and apparatus, including computer programs encoded on a computer storage medium, for providing content. One of the methods includes providing a plurality of image content items to an application interface of a client device for presentation; receiving a user selection of a particular image content item of the plurality of presented image content items; and responsive to the selection, providing a combination of native content and third party content associated with the selected image content item, wherein the native content includes a close up view of the selected image content item and the third party content includes a third party webpage.

20 Claims, 7 Drawing Sheets

(56) References Cited

U.S. PATENT DOCUMENTS

| | | | |
|---|---|---|---|
| 9,336,528 | B2 | 5/2016 | Beaton |
| 9,396,279 | B1 | 7/2016 | O'Donnell |
| 9,405,425 | B1* | 8/2016 | Weston ............... G06Q 30/0241 |
| 9,509,768 | B2 | 11/2016 | Ormseth et al. |
| 9,792,657 | B2* | 10/2017 | Shaham ................. G06Q 50/01 |
| 9,846,682 | B1 | 12/2017 | Righetto et al. |
| 9,858,244 | B1 | 1/2018 | Bjorkegren |
| 9,916,392 | B2 | 3/2018 | Zhang et al. |
| 10,140,256 | B2 | 11/2018 | Hohnhold et al. |
| 10,176,152 | B2* | 1/2019 | Hinrichs ............. G06F 3/04847 |
| 10,198,413 | B2 | 2/2019 | Kofman et al. |
| 10,423,707 | B2* | 9/2019 | Young .................. H04L 67/306 |
| 10,452,706 | B2 | 10/2019 | Hsiao et al. |
| 10,706,212 | B1 | 7/2020 | Righetto et al. |
| 10,713,666 | B2 | 7/2020 | Freishtat et al. |
| 10,749,988 | B2* | 8/2020 | Lewis .................... H04L 67/75 |
| 10,809,956 | B1* | 10/2020 | Bragdon ............. G06F 3/04842 |
| 10,839,405 | B2* | 11/2020 | Carriero ............. G06Q 30/0283 |
| 11,087,359 | B1 | 8/2021 | Agarwal et al. |
| 2006/0206824 | A1 | 9/2006 | Landschaft et al. |
| 2007/0162953 | A1 | 7/2007 | Bolliger et al. |
| 2008/0152260 | A1 | 6/2008 | Cheng et al. |
| 2009/0094377 | A1 | 4/2009 | Zahavi et al. |
| 2009/0094525 | A1 | 4/2009 | Coelius et al. |
| 2009/0265616 | A1 | 10/2009 | Kyu et al. |
| 2010/0049707 | A1 | 2/2010 | Faria et al. |
| 2010/0251165 | A1 | 9/2010 | Williams |
| 2011/0161479 | A1 | 6/2011 | Freishtat et al. |
| 2011/0202827 | A1 | 8/2011 | Freishtat et al. |
| 2012/0010995 | A1 | 1/2012 | Skirpa et al. |
| 2013/0091026 | A1 | 4/2013 | Deng et al. |
| 2013/0127916 | A1 | 5/2013 | Van Slembrouk et al. |
| 2013/0246904 | A1 | 9/2013 | Seliger et al. |
| 2013/0318593 | A1 | 11/2013 | Smith et al. |
| 2013/0325671 | A1 | 12/2013 | Glass et al. |
| 2014/0136959 | A1 | 5/2014 | Matas et al. |
| 2014/0282029 | A1* | 9/2014 | Vishria ................. H04L 67/306 715/738 |
| 2014/0322690 | A1 | 10/2014 | Fisher |
| 2014/0344658 | A1 | 11/2014 | Srinivasan et al. |
| 2015/0066665 | A1* | 3/2015 | Long .................. G06Q 30/0277 705/14.73 |
| 2015/0066967 | A1* | 3/2015 | Reardon ............. G06F 16/9535 707/E17.014 |
| 2015/0149583 | A1 | 5/2015 | Chung |
| 2015/0178786 | A1 | 6/2015 | Claessens |
| 2015/0220492 | A1 | 8/2015 | Simeonov et al. |
| 2015/0220499 | A1 | 8/2015 | Katic |
| 2015/0227504 | A1 | 8/2015 | Zhang et al. |
| 2015/0242525 | A1 | 8/2015 | Perlegos |
| 2015/0309701 | A1 | 10/2015 | Jätzold et al. |
| 2015/0339785 | A1 | 11/2015 | Bischke et al. |
| 2016/0112703 | A1 | 4/2016 | Hafey |
| 2016/0267060 | A1 | 9/2016 | Skirpa et al. |
| 2016/0350437 | A1 | 12/2016 | O'Donnell |
| 2016/0350953 | A1 | 12/2016 | Mittelstaedt et al. |
| 2017/0024766 | A1 | 1/2017 | Thomson et al. |
| 2017/0052969 | A1 | 2/2017 | Carriero et al. |
| 2017/0090734 | A1 | 3/2017 | Fitzpatrick |
| 2017/0185254 | A1 | 6/2017 | Zeng et al. |
| 2017/0220306 | A1 | 8/2017 | Price et al. |
| 2017/0230433 | A1 | 8/2017 | Carlos et al. |
| 2017/0242931 | A1 | 8/2017 | Lewis et al. |
| 2017/0250941 | A1* | 8/2017 | Weisberg ............... H04W 4/185 |
| 2017/0269819 | A1 | 9/2017 | Pinpin et al. |
| 2017/0329478 | A1 | 11/2017 | Chen et al. |
| 2018/0018078 | A1 | 1/2018 | Hundemer et al. |
| 2018/0096526 | A1 | 4/2018 | Valdivia et al. |
| 2018/0107758 | A1 | 4/2018 | Ha et al. |
| 2018/0121070 | A1* | 5/2018 | Murphey ................ H04L 67/53 |
| 2018/0130097 | A1* | 5/2018 | Tran ...................... G06F 3/0485 |
| 2018/0150977 | A1 | 5/2018 | Peng et al. |
| 2018/0191798 | A1 | 7/2018 | Zhu et al. |
| 2018/0262798 | A1 | 9/2018 | Ramachandra |
| 2018/0300756 | A1 | 10/2018 | Saxena et al. |
| 2018/0330724 | A1 | 11/2018 | Miller et al. |
| 2019/0034441 | A1 | 1/2019 | Capon |
| 2019/0065613 | A1 | 2/2019 | Bilsten |
| 2019/0079640 | A1 | 3/2019 | Page et al. |
| 2019/0286689 | A1 | 9/2019 | Perkins et al. |
| 2020/0145504 | A1* | 5/2020 | Price ........................ G06N 5/04 |
| 2020/0195751 | A1 | 6/2020 | Grue et al. |
| 2020/0257437 | A1 | 8/2020 | Fitzpatrick |

\* cited by examiner

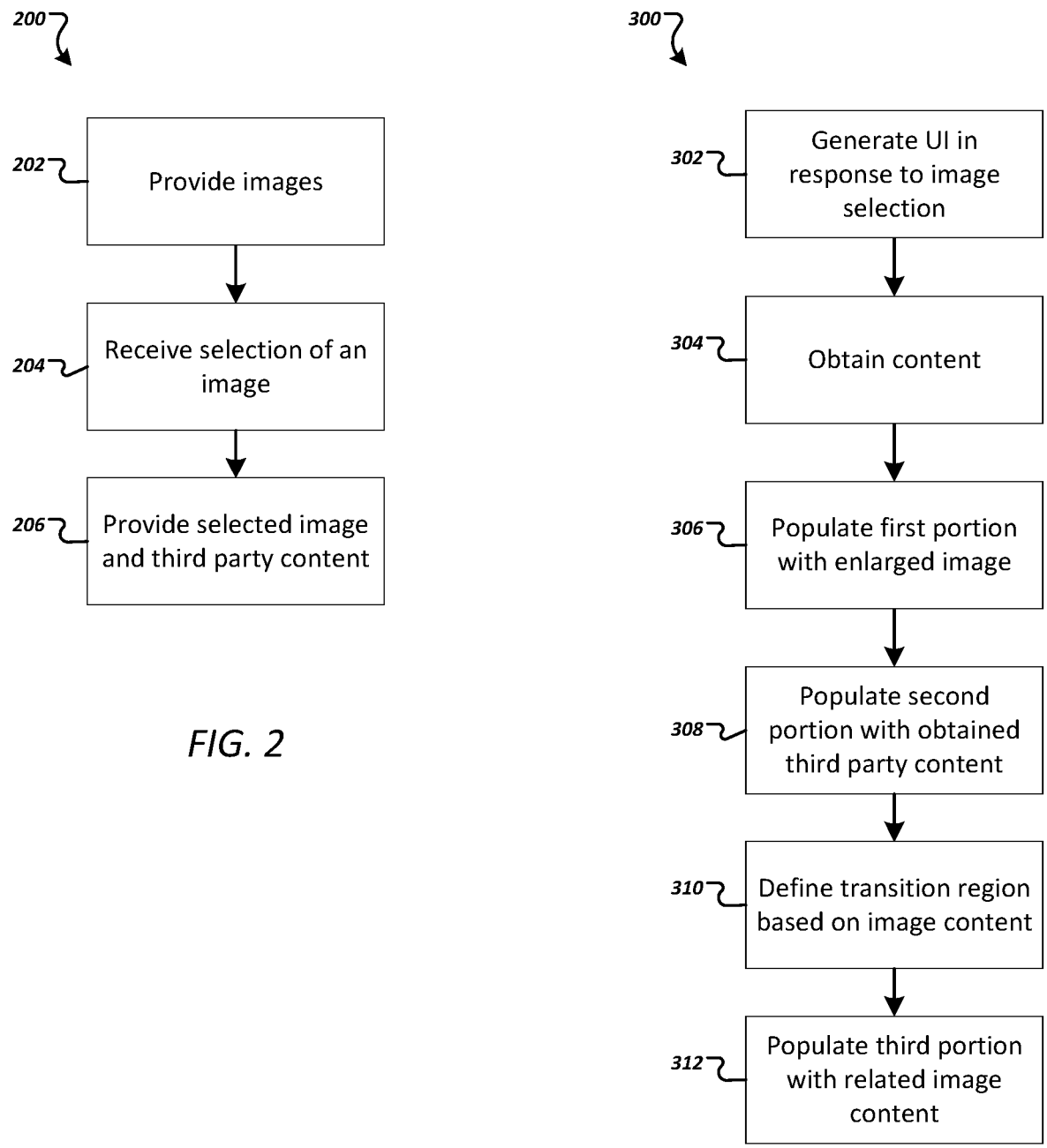

CONTENT PRESENTATION

CROSS-REFERENCE TO RELATED APPLICATIONS

This application is a continuation application of and claims priority to U.S. application Ser. No. 17/876,827, filed Jul. 29, 2022, and entitled "Content Presentation," which is a continuation application of and claims priority to U.S. application Ser. No. 17/208,737, filed on Mar. 22, 2021, and entitled "Content Presentation," which is a continuation application of and claims priority to U.S. application Ser. No. 15/926,955, filed on Mar. 20, 2018, and entitled "Content Presentation," the disclosures of which are hereby incorporated by reference herein in their entireties.

BACKGROUND

This specification relates to providing content for display on a user device.

Conventional mobile applications can present content to users in a user interface of a mobile device. This content can include content associated with third party web content. Typically, selection of this content results in execution of a separate browser session that opens the associated third party web content.

SUMMARY

This specification describes technologies relating to content presentation. In particular, a user device can present a number of images. For example, the images can be presented in response to a user search or based on user content preferences. In response to a selection of an image, an interface is presented that includes both native content and third party web content. The native content can include an enlarged version of the selected image. Presentation of the third party web content can include presenting a web view portion of the interface that presents the third party web content. Additional native content related to the selected image can also be presented in the interface.

In general, one innovative aspect of the subject matter described in this specification can be embodied in methods that include the actions of providing a plurality of image content items to an application interface of a client device for presentation; receiving a user selection of a particular image content item of the plurality of presented image content items; and responsive to the selection, providing a combination of native content and third party content associated with the selected image content item, wherein the native content includes a close up view of the selected image content item and the third party content includes a third party webpage. Other embodiments of this aspect include corresponding computer systems, apparatus, and computer programs recorded on one or more computer storage devices, each configured to perform the actions of the methods.

This specification uses the term "configured" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

The foregoing and other embodiments can each optionally include one or more of the following features, alone or in combination. In particular, one embodiment includes all the following features in combination. The native content further includes one or more related image content items. The native content further includes an overlay prompting the user to scroll down for the third party content. The overlay has a color selected based on a dominant color of the selected image content item. The third party content is presented in a webview portion of an interface layout positioned below the native content corresponding to an enlarged version of the selected image content item. The webview portion does not include an address bar indicating that the third party content is part of a distinct web page. The third party content associated with one or more of the plurality of image content items are fetched during presentation of the plurality of image content items.

Particular embodiments of the subject matter described in this specification can be implemented so as to realize one or more of the following advantages. A more integrated experience is provided to users allowing them to view both native and third party content in a single interface. The user can scroll and select within the web page content while remaining in an interface of an application without invoking a separate browser application. The transition between native content and third party web content can be relatively seamless based on how the third party web content is presented and by incorporating transitions that blend the space between the native content and the third party content. Additionally, providing web content within the user interface of the application can provide a consistent user experience in which selection of some image content items results in third party content being presented while selection of other image content items does not. Because users reach the third party web content with fewer interactive steps, they may be more likely to engage with the third party web content. This can lead to higher clickthrough rates for third party content and higher advertisement conversion rates.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for providing content.

FIG. 3 is a flow diagram of an example process for populating a user interface with content.

Like reference numbers and designations in the various drawings indicate like elements.

DETAILED DESCRIPTION

Figure 1:
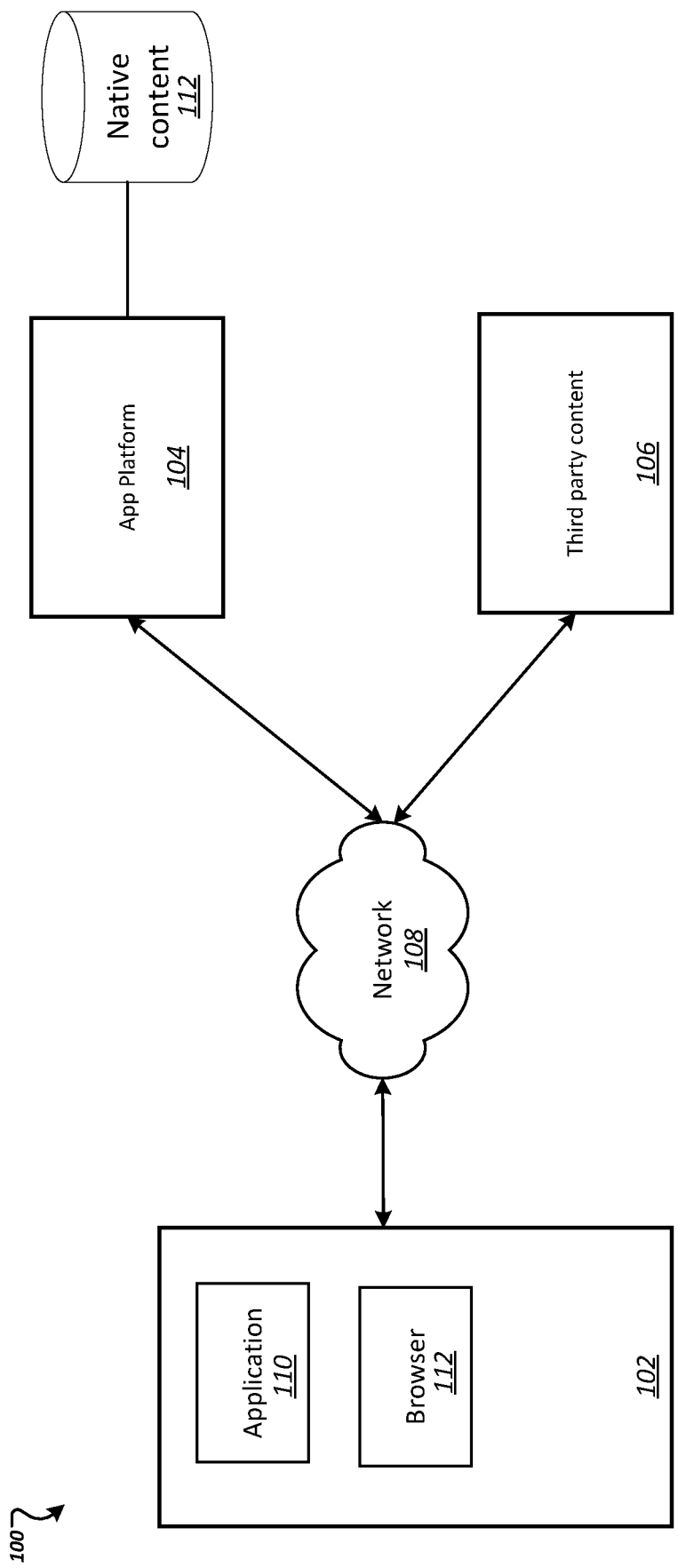
FIG. 1 is block diagram of an example content delivery system.

FIG. 1 is block diagram of an example content delivery system 100. Content delivery system 100 includes a user device 102, application platform 104, and third party content 106 communicably coupled to a network 108.

The user device 102 can be a mobile device of a user. The mobile device can be a mobile phone, tablet, or other portable computing device. The user device 102 is shown as including an application 110 and a browser 112. The user device 102 can include other applications, which are not illustrated for clarity.

The application 110 is a mobile application configured to communicate with the application platform 104 using network 108, e.g., the internet. For example, the user can access content from the application platform 104 using a user interface of the application 110 presented by a display of the user device 102. In some implementations, the application 110 is associated with a social media platform provided in concert with the application platform 104. For example, the application 110 can be associated with a visual bookmarking and discovery platform in which users can view images saved or uploaded by other users and can store collections of selected images. Users can use the application 110, for example, to explore different subjects and save content for later viewing.

The browser 112 can be a web browser application used to access content through the network 108. For example, the browser 112 can be used by the user to view web sites and search for content using a search engine.

The application platform 104 can communicate with user installed applications on various user devices. For example, the application platform 104 can receive requests for particular content from the application 110. In response to the request, the application platform 104 can identify responsive data and provide the data to the application 110, e.g., for display on the user device. For example, a user can enter a particular search query in a search field of the application 110. The search query is provided to the application platform 104. The application platform 104 identifies content responsive to the query, for example, a collection of images matching one or more terms of the search query. The images matching one or more terms of the search query can be identified and selectively retrieved, for example, from native content store 114. The application platform 104 then provides particular responsive content, e.g., a group of the identified images, to the user device.

In another example, a user can select a particular presented image in the user interface of the application 110. In response to receiving an indication of the selection, the application platform 104 can provide additional content to the user device 102 for display by the application 110. For example, the application platform 104 can provide a higher resolution version of the selected image for presentation as an enlarged version on the application user interface. The application platform 104 can also provide related image content. The related image content can be image content identified as similar to the selected image.

The application platform 104 can also provide third party content 106 to the user device 102. For example, the third party content 106 can include sponsored content items generated by third party providers and provided to the application platform 104. These sponsored content items can be incorporated in the group of images provided to the user device. The third party content 106 can also include third party web content that can be pre-fetched content obtained from respective web pages. The third party content 106 can also be web page content retrieved at the time of providing such content to the user device. For example, in response to a user selection of a sponsored content item, the application platform 104 can access the third party web page content and provide it to the user device, as described in greater detail below.

FIG. 2 is a flow diagram of an example process 200 for providing content. For convenience, the process 200 will be described with respect to a system that performs the process. For example, a system can correspond to the application platform 104 of FIG. 1.

The system provides a group of images to a user device, e.g., user device 102 (202). The group of images can be provided to the user device, for example, in response to a request received from an application executing on the user device. The request can be a search query seeking particular content. The request can also be a request to view content previously stored to a collection. Alternatively, the group of images can be provided as part of a "home" interface of the application upon launch. In that case, the images can be provided, for example, based on user interests, e.g., from a user profile, or based on prior user interactions with content provided by the application platform.

The group of images can be provided for presentation in an application user interface of the user device. For example, the user interface can present an array of images as described below with respect to FIG. 4.

The system receives an indication of a user selection of an image (204). For example, the user device can be a touch screen enabled device. The user can use the touch interface to select a particular image presented in the application user interface. Selection of an image can trigger a communication to the system reporting the selection.

The system provides the selected image and third party content for presentation (206). For example, in response to the indication of the user selection, the system can identify corresponding content to return to the user device for presentation in a user interface of the application. This content can include a higher resolution version of the selected image, third party content or an identifier to such content, and optionally additional native content from the system for presentation, e.g., additional images to present that are related to the selected image. The system can provide instructions for how the user interface is to lay out the provided content. An example of populating a user interface with content is described below with respect to FIG. 3.

In some implementations, a threshold determination is made as to whether there is third party content to provide. In particular, some images may be associated with third party content while others are not. For example, particular images may be sponsored for third party content, e.g., by advertisers. In some implementations, when sponsoring a particular image, a third party can associate an address of the third party content, e.g., a URL, with the image. When the image is selected, the system identifies the associated URL and uses the URL to retrieve the third party web content. If the system determines that there is no third party content associated with the selected image, the system provides the enlarged version of the image and, optionally, one or more additional images determined to be related to the selected image, e.g., based on visual similarity.

In some implementations, additional data is provided to the user device along with the group of images to present.

This can be preloaded on the user device and displayed if requested. For example, the higher resolution forms of the images can be sent ahead so that they can be quickly loaded upon selection. In some implementations, at least some of the third party content, e.g., web content, is pre-fetched and provided to the user device with or contemporaneously to the group of images and prior user selection. This can allow the third party content to be quickly loaded in response to a selection of a corresponding image.

FIG. 3 is a flow diagram of an example process 300 for populating a user interface with content. For convenience, the process 200 will be described with respect to a system that performs the process. For example, a system can correspond to the client device 102 in communication with the application platform 104 of FIG. 1.

The client device generates a user interface in response to an image selection (302). For example, the user can interact with an interface of a particular application, e.g., application 110 of FIG. 1. The interaction can include selecting a particular image from multiple presented images. The application includes code that defines a layout for presenting user interfaces on the client device. The code can demarcate particular regions of the user interface for presenting particular types of content. In response to an image selection, the application can load a corresponding user interface layout responsive to the selection. Additionally, the application can interact with the remote application platform to receive content for populating the user interface.

The client device obtains content for populating the user interface (304). Some of the obtained content can be stored locally on the client device while other content can be obtained from the application platform. For example, some content can be pre-fetched by the application to reduce latency in loading subsequent content.

The client device populates a first portion of the user interface with an enlarged form of the selected image (306). The enlarged form of the selected image can be a separate higher resolution image that corresponds to the selected image or can be a scaled up version of the selected image. The first portion can be a top portion of the user interface. When generated, the user interface provides the user with an enlarged view of the selected image as occupying the first portion of the user interface, which may correspond to substantially all of the visible portion of the user interface on the display.

The client device populates a second portion of the user interface with obtained third party content (308). The obtained third party content can be particular web content. For example, the second portion of the user interface can define a webview portion that provides for display of web content without using a separate browser application. A webview allows for the rendering of HTML content as part of a non-browser application user interface. The webview can scale the web content for suitable display within the confines of the user interface portion.

When presented, the user can interact with the web content in a similar manner as with a browser. For example, the user can scroll within the web content and select links to other web content, e.g., other pages of a website. The user can navigate the web content while remaining in the user interface. Thus, the user can interact with the web content through the webview without triggering a separate browser session. In some implementations, some or all of the second portion is not visible in the initially presented portion of the user interface.

In some implementations, the web content is specified by a third party sponsor of the selected image. Thus, the web content can be specifically associated with the selected image, for example, a landing page associated with a sponsored image. Thus, for example, a sponsor or advertiser can specify a web page target associated with an image advertisement.

The client device defines a transition region based on the image content (310). The transition from the enlarged image to the web content can include a prompt encouraging the user to interact with the user interface to scroll to the web content (e.g., a "scroll down" prompt). Additionally, in some implementations, a transition area can be designed to complement the enlarged image to provide a more seamless transition between the image and the web content. For example, the prompt can be associated with an overlay portion between the first portion and the second portion. The overlay portion can be assigned one or more colors to complement one or more dominant colors of the enlarged image. Similarly, the third party provider can design the web content to complement the colors of the enlarged image.

The client device populates a third portion of the user interface with related image content (312). A third portion of the user interface can be positioned below the web content of the second portion. The third portion can include one or more related images that are determined by the system to be related to the enlarged image. For example, in response to the selection of the image, the application platform can determine one or more related images, e.g., from native content. The related images can be identified, for example, based on visual similarity with the selected image. The related images can become visible after scrolling the user interface beyond the web portion.

Figure 4:
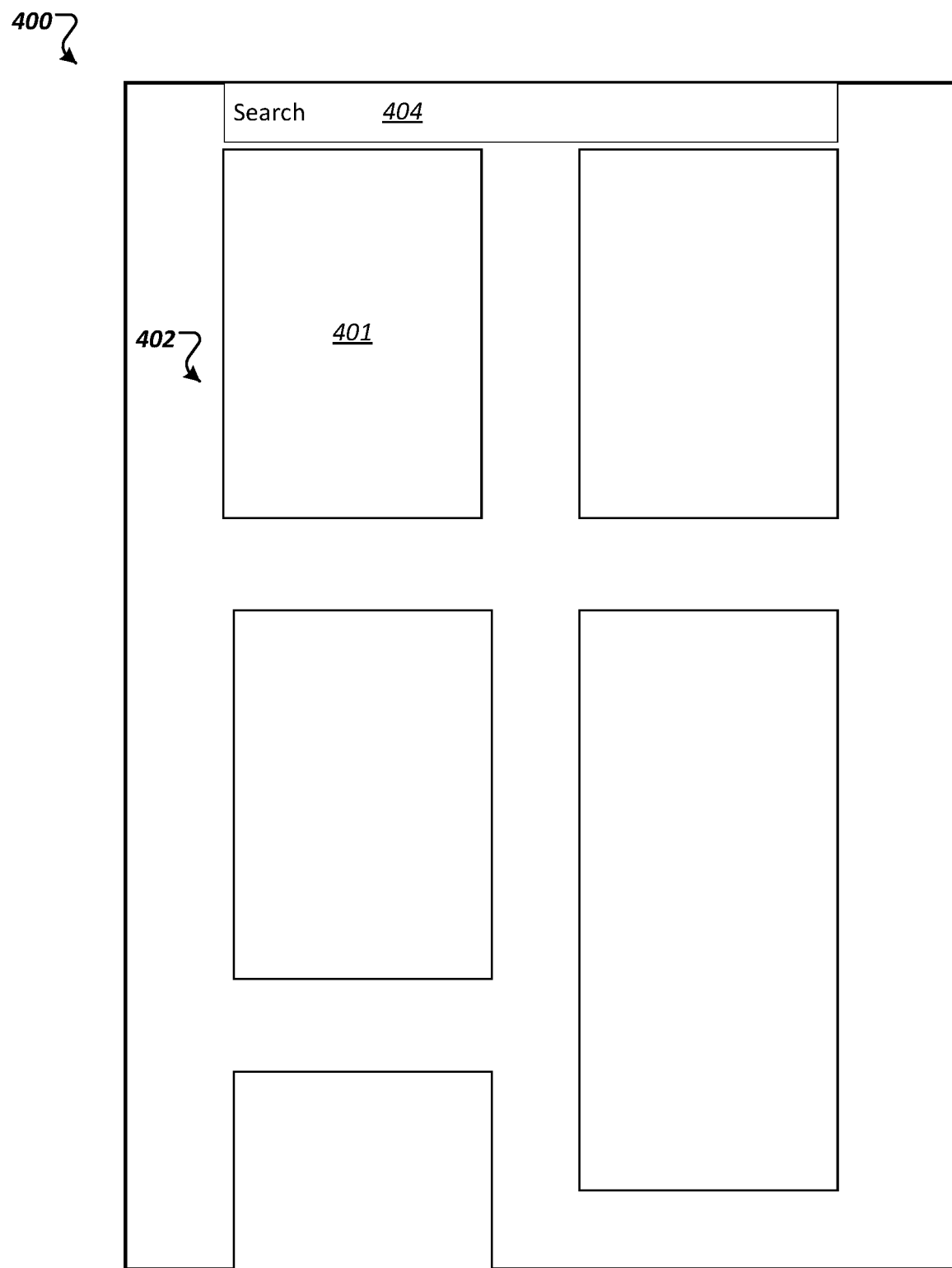
FIG. 4 is a diagram representing an example user interface displaying multiple images.

FIG. 4 is a diagram representing an example user interface 400 displaying multiple images 402. The user interface 400 can represent the visible portion of a user interface when displayed on a display device. Thus, the user interface may extend further with more images displayed in response to scrolling in a particular direction. The user interface 400 shows a search bar 404 in which a user can specify particular search terms and view, in response, images that are responsive to the search terms. Additionally, the user can select individual images of the multiple images 402, for example image 401, by tapping on the image in a touch screen display or selecting the image with a cursor controlled by a particular input device.

Figure 5:
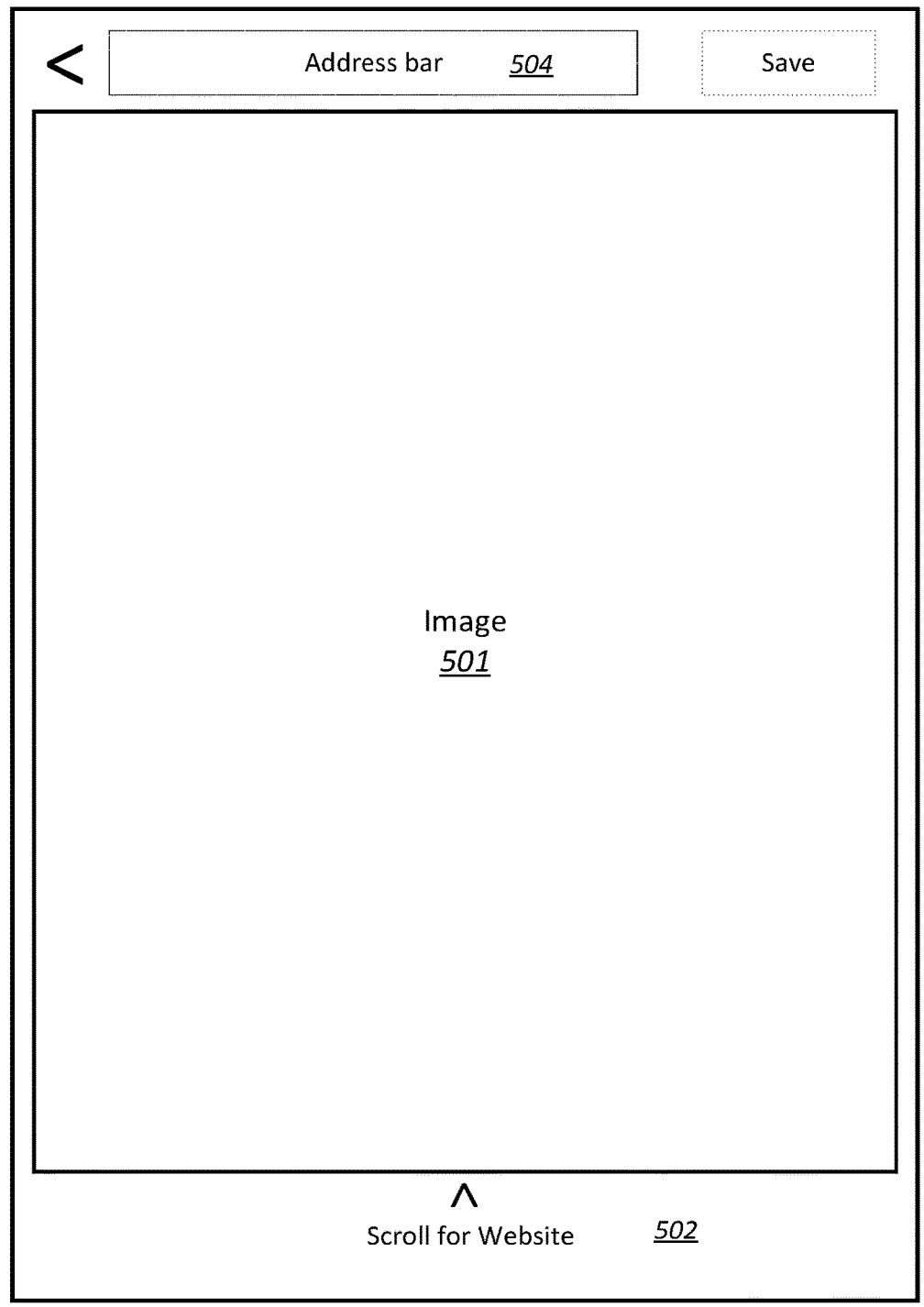
FIG. 5 is a diagram representing an example user interface presented in response to a selected image.

FIG. 5 is a diagram representing an example user interface 500 presented in response to a selected image. In particular, FIG. 5 can represent a user interface presented after selection of image 401 of FIG. 1. The user interface 500 includes an image 501. The image 501 can represent an enlarged version of a selected image. The enlarged version can be a higher resolution version of a previously selected image.

The user interface 500 also includes a prompt 502. The prompt 502 follows the image 501 and is a prompt to action for the viewing user. In particular, the prompt 502 is a call to scroll the user interface to view particular web content. The web content can be third party content associated with the image 501. The prompt 502 can include visual features to blend in with the user interface, for example, coloring that is determined based on one or more colors of the image 501. For example, the color of the transition region associated with the prompt can be colored based on the dominant color of the selected image, e.g., a matching or visually similar color. The user interface 500 also includes an address bar 504. The address bar 504 corresponds to the URL address of the web content provided if the user scrolls down below the prompt 502 to view the web content.

Figure 6:
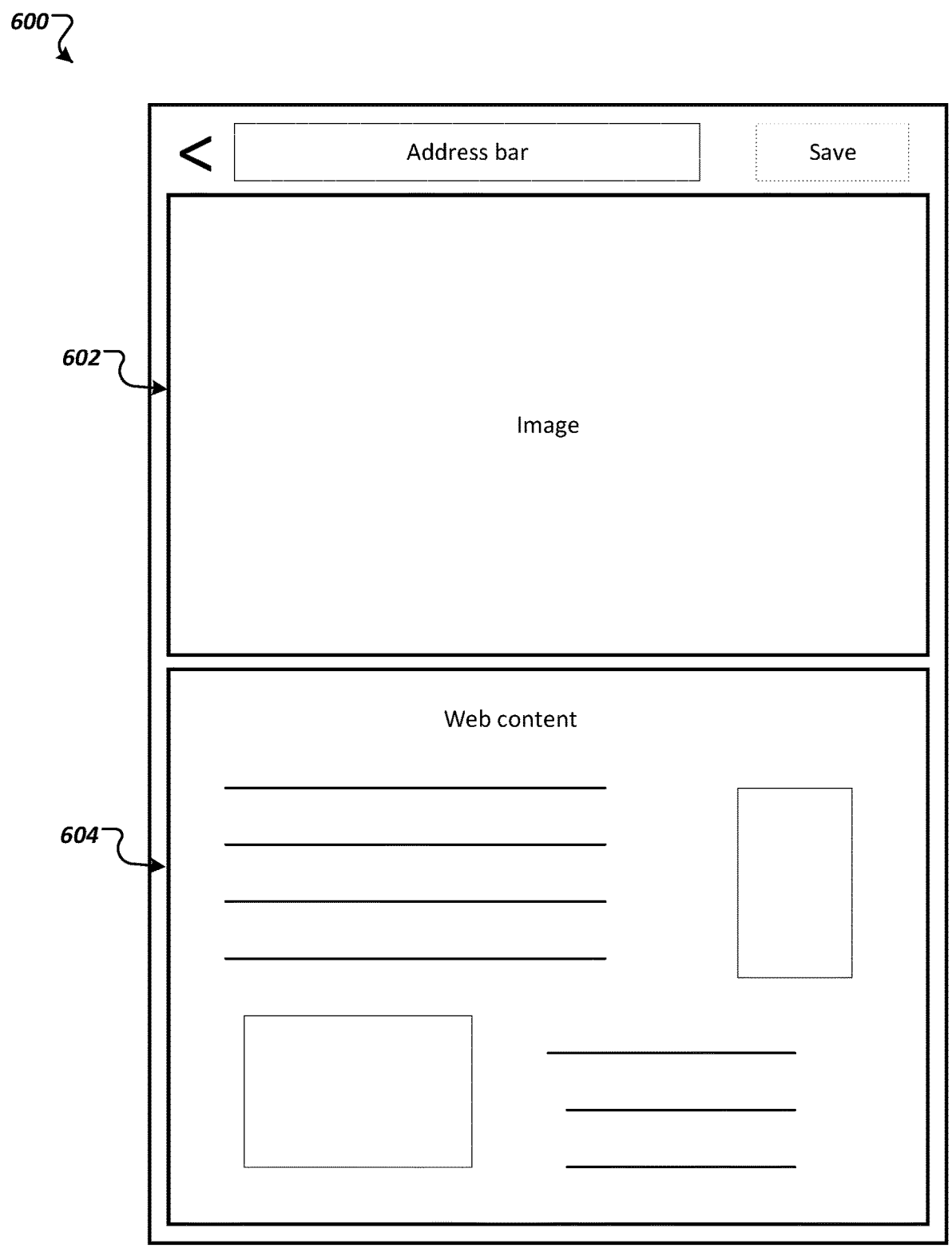
FIG. 6 is a diagram representing an example user interface including web content.

FIG. 6 is a diagram representing an example user interface 600. The user interface 600 can be the user interface 500 of FIG. 5 after scrolling a first amount. The user interface 600 includes an image portion 602 and web content 604. The image portion 602 can be a portion of a larger image in that has been scrolled such that only a small bottom portion is currently visible on a display. The image portion 602 can be a portion of the image 501 of FIG. 5 after scrolling some portion of the image.

The web content 604 is third party web content integrated into the user interface of the application, for example, using a web view. The web content 604 is typically content related to the image. For example, an advertiser can link an image to a particular web page. In response to the selection of the image, the web page content is then provided along with the enlarged version of the image. The web content 604 can be presented within the user interface of the application such that there is a seamless transition from the image to the web content through scrolling. The user can interact with the web content 604, for example, by scrolling within the web page, selecting links, etc. The user interactions with the web content can generate responses that remain within the user interface 600 of the application. For example, if the user selects a link within the web page, a target web page of the web site can be presented within the web content 604. In some implementations, there are no borders or other visual demarcations separating the web content from the image content in the user interface 600.

Figure 7:
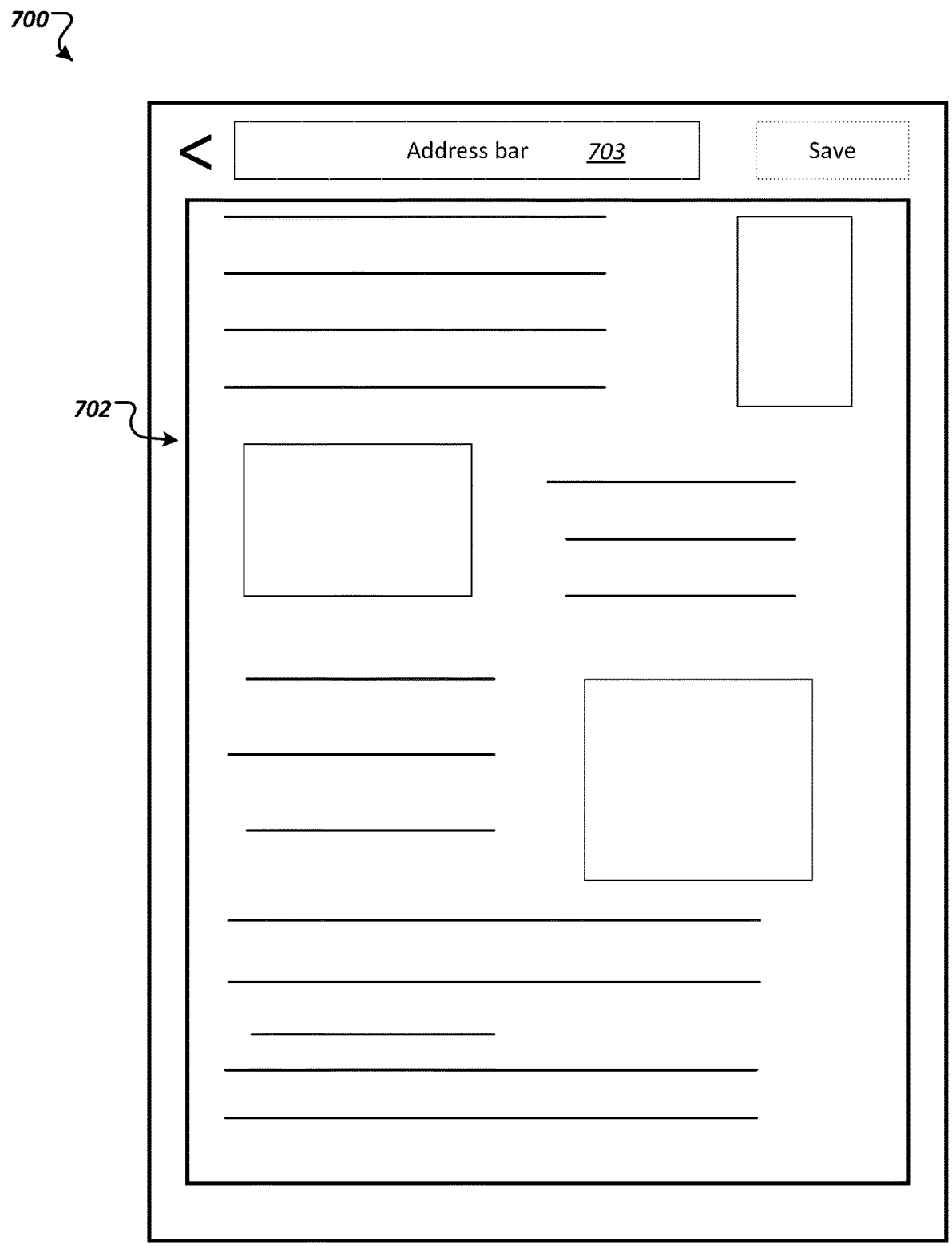
FIG. 7 is a diagram representing an example user interface including web content.

FIG. 7 is a diagram representing the example user interface 700. The user interface 700 can be the user interface 600 of FIG. 6 after scrolling a second amount. In particular, the user interface 700 presents web content 702. The web content 702 can be the result of further scrolling such that the image portion, e.g., image portion 602 of FIG. 6 is no longer visible in the user interface. Thus, in this example, the web content 702, which can be the same as web content 604 of FIG. 6, takes up the full content portion of the user interface 700. Additionally, while the example user interface 700 includes an address bar 703 corresponding to the network address of the web content, in some other implementations, the address bar 703 is omitted to provide a more seamless interface for the application.

In some implementations, once the bottom of the web view portion is reached, no further scrolling is possible. In other implementations, however, there is additional content that can be presented beyond the web content.

Figure 8:
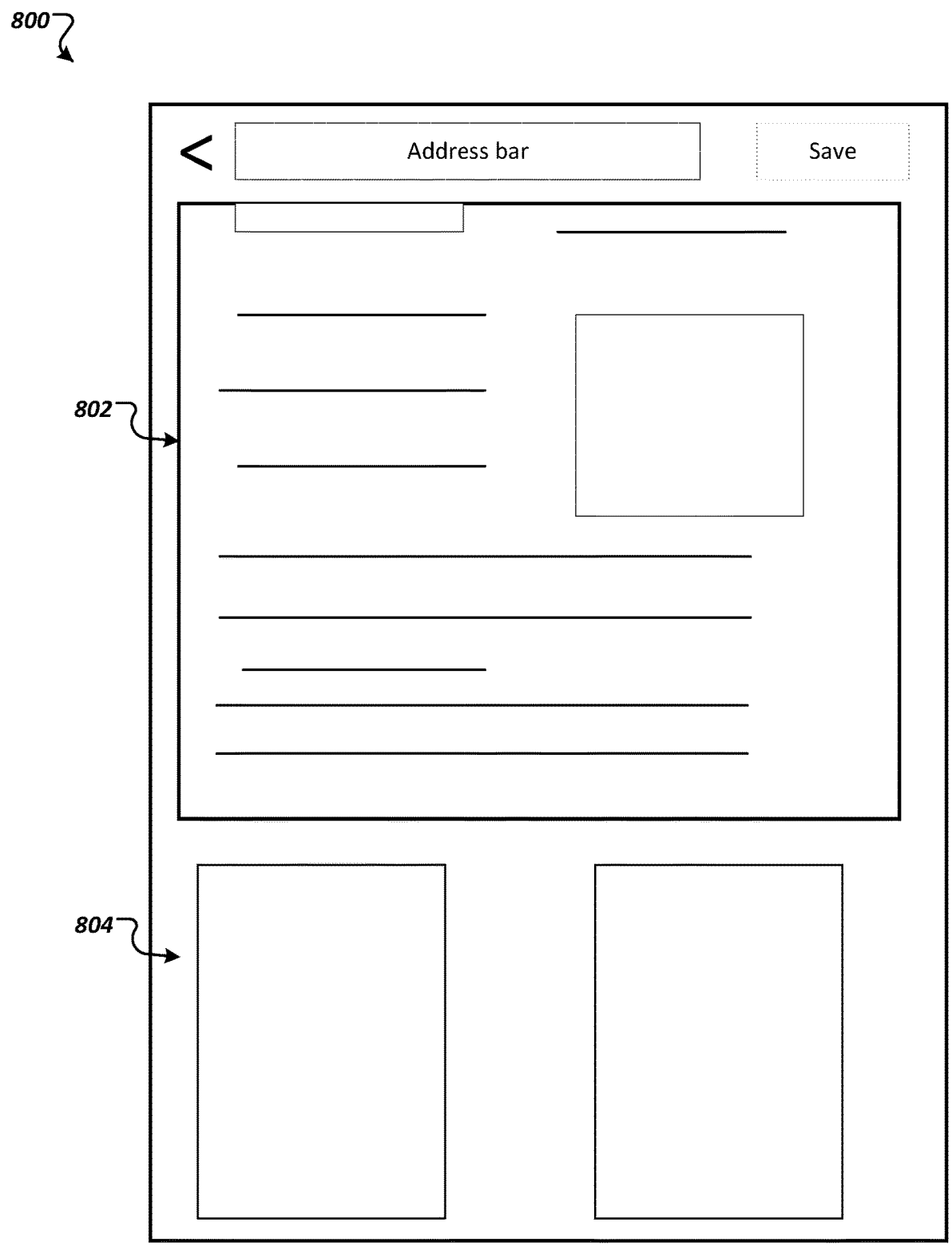
FIG. 8 is a diagram representing an example user interface including related images.

FIG. 8 is a diagram representing the example user interface 800. The user interface 800 can be the user interface 700 of FIG. 7 after scrolling a third amount. In particular, the user interface 800 shows a web content portion 802 and a related images portion 804. The web content portion 802 can be the result of further scrolling such that the web content, e.g., web content 702 of FIG. 7, has had a portion scrolled out of visibility in the user interface.

The related images portion 804 can show one or more images related to an image selected by the user, e.g., the image 401 of FIG. 4 that resulted in the generation of the user interface 800. The related images in the related images portion 804 can be native content obtained, e.g., from the application platform associated with the application. The user can select an image of the related images to view an enlarged version of the image. In some implementations, selection of a particular related image results in an interface including the enlarged version of the image as well as web content in a similar manner as described above.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CDROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system, comprising:
   one or more processors; and
   a memory storing program instructions that, when executed by the one or more processors, cause the one or more processors to at least:
      determine, in response to a request for content items, a first plurality of content items from a corpus of content items;
      cause at least a portion of the first plurality of content items to be presented on a client device;
      receive a first selection of a first content item of the first plurality of content items; and
      cause, in response to the first selection of the first content item from the first plurality of content items, a user interface to be presented on the client device, wherein the user interface includes:
a first portion including an alternate form of the selected first content item;
a second portion including third-party webpage content that is associated with the selected first content item and provides access to the third-party webpage content from the second portion of the user interface; and
a third portion including a second plurality of content items that are related to the selected first content item.

2. The computing system of claim 1, wherein:
the at least a portion of the first plurality of content items are presented on the client device according to a first layout; and
the user interface is presented on the client device according to a second layout.

3. The computing system of claim 1, wherein the program instructions that, when executed by the one or more processors, further cause the one or more processors to at least:
receive an interaction with the user interface indicating at least one of scrolling of the third-party webpage content or a second selection of a link of the third-party webpage content.

4. The computing system of claim 1, wherein the third-party webpage content includes a uniform resource locator (URL) associated with the selected first content item.

5. The computing system of claim 1, wherein the alternate form of the selected first content item includes an enlarged version of the selected first content item.

6. A computer-implemented method, comprising:
in response to a first selection of a first content item from a first plurality of content items:
causing a first portion of a user interface to be presented on a client device, the first portion of the user interface including an alternate form of the selected first content item;
causing a second portion of the user interface to be presented on the client device, the second portion of the user interface including third-party webpage content associated with the selected first content item and providing access to the third-party webpage content from the second portion of the user interface; and
causing a third portion of the user interface to be presented on the client device, the third portion of the user interface including a second plurality of content items that are related to the selected first content item.

7. The computer-implemented method of claim 6, further comprising: prior to the first selection of the first content item:
receiving a request for content items;
identifying the first plurality of content items from a corpus of content items; and
causing the first plurality of content items to be presented on the client device.

8. The computer-implemented method of claim 7, wherein:
at least a portion of the first plurality of content items are presented on the client device according to a first layout; and
the user interface is presented on the client device according to a second layout.

9. The computer-implemented method of claim 7, wherein the user interface includes at least one of:
a first demarcation between the first portion of the user interface and the second portion of the user interface; or
a second demarcation between the second portion of the user interface and the third portion of the user interface.

10. The computer-implemented method of claim 7, wherein at least some of the first plurality of content items are associated with respective universal resource locators (URLs).

11. The computer-implemented method of claim 6, wherein the first content item is associated with a uniform resource locator (URL).

12. The computer-implemented method of claim 6, wherein:
the third-party webpage content includes a link; and
the computer-implemented method further comprises:
receiving an interaction with the user interface indicating at least one of scrolling of the third-party webpage content or a second selection of the link.

13. The computer-implemented method of claim 6, wherein the second portion of the user interface is presented without initiating a separate browsing session.

14. The computer-implemented method of claim 6, wherein the second plurality of content items are determined based at least in part on visual similarities between the first content item and the second plurality of content items.

15. The computer-implemented method of claim 6, wherein the user interface further includes a transition region between the first portion and the second portion configured to transition between the second portion and the third portion via scrolling.

16. A non-transitory computer-readable medium having instructions stored thereon that, when executed by one or more processors, cause the one or more processors to at least:
in response to a first selection of a first image from a first plurality of images:
cause a first portion of a user interface to be presented on a client device, the first portion of the user interface including an alternate version of the first image;
cause a second portion of the user interface to be presented on the client device, the second portion of the user interface including third-party webpage content associated with the first image;
provide access to the third-party webpage content from the second portion of the user interface without initiating a separate browsing session; and
cause a third portion of the user interface to be presented on the client device, the third portion of the user interface including a second plurality of images that are related to the first image.

17. The non-transitory computer-readable medium of claim 16, wherein the third-party webpage content includes an identifier associated with the first image.

18. The non-transitory computer-readable medium of claim 16, wherein the third-party webpage content is at least one of:
pre-fetched; or
retrieved in response to selection of the first image.

19. The non-transitory computer-readable medium of claim 16, wherein the user interface includes at least one of:
a first demarcation between the first portion of the user interface and the second portion of the user interface; or
a second demarcation between the second portion of the user interface and the third portion of the user interface.

20. The non-transitory computer-readable medium of claim 16, wherein:

the third-party webpage content includes a link; and
access to the third-party webpage content includes at least one of scrolling of the third-party webpage content or a second selection of the link.

\* \* \* \* \*